United States Patent [19]

Hakoun et al.

[11] Patent Number: 5,416,882
[45] Date of Patent: May 16, 1995

[54] DEVICE FOR POSITIONING AND RETAINING OPTICAL FIBERS IN A LAYER

[75] Inventors: Roland Hakoun, Domont; Michel Reslinger, Bondoufle; Gérard Godard, Noiseau, all of France

[73] Assignee: Mars Actel, Vrigne Aux Bois, France

[21] Appl. No.: 155,701

[22] Filed: Nov. 23, 1993

[30] Foreign Application Priority Data

Nov. 25, 1992 [FR] France ................. 92 14170

[51] Int. Cl.⁶ ................................................ G02B 6/44
[52] U.S. Cl. ..................................... 385/136; 385/137
[58] Field of Search ............... 385/53, 54, 55, 56, 385/58, 59, 70, 71, 75, 76, 77, 136, 137

[56] References Cited

U.S. PATENT DOCUMENTS

| | | | |
|---|---|---|---|
| 5,020,874 | 6/1991 | Zell et al. | 385/54 |
| 5,160,569 | 11/1992 | Ott et al. | 156/439 |
| 5,173,959 | 12/1992 | Cambriello | 385/89 |
| 5,216,741 | 6/1993 | Blijleven et al. | 385/137 |

FOREIGN PATENT DOCUMENTS

| | | | |
|---|---|---|---|
| 0340867 | 11/1989 | European Pat. Off. | G02B 6/36 |
| 3424602 | 1/1986 | Germany | G02B 6/24 |

*Primary Examiner*—Frank Gonzalez
*Attorney, Agent, or Firm*—Sughrue, Mion, Zinn, Macpeak & Seas

[57] ABSTRACT

The device for positioning and retaining optical fibers in a layer including firstly a channel-section base having two L-shaped slots disposed facing each other in the respective flanges of the base, and adapted to positioning the fibers in a layer in the respective horizontal segments of the slots, secondly a grooved guide surface for guiding the fibers, the surface interconnecting the horizontal segments of said slots, and thirdly retaining means for retaining the fibers on the grooved surface. Application: handling and connecting together optical fibers.

13 Claims, 2 Drawing Sheets

DEVICE FOR POSITIONING AND RETAINING OPTICAL FIBERS IN A LAYER

The present invention relates to a device for positioning and retaining sheathed and initially independent optical fibers in a layer. Such devices enable, in particular, optical fibers in two identical layers to be connected together by the known means of welding or of splicing that are used for connecting together the fibers of two ribbons. Such devices also enable each of the preparatory operations that need to be performed prior to connection, such as stripping and cutting, to be performed simultaneously on all the fibers in each layer.

BACKGROUND OF THE INVENTION

In order to connect together two sets of initially-independent fibers by using one of the methods applied to ribbons of optical fibers, a known method consists in creating a ribbon from each of the two sets of fibers prior to connection. The sheathed fibers in each set are assembled together side-by-side by means of a common resin coating that constitutes the outer coating of the resulting ribbon. Assembling fibers together in ribbons is time-consuming and costly, and it requires bulky equipment. Such assembly physically secures the fibers together.

OBJECTS AND SUMMARY OF THE INVENTION

An object of the present invention is to enable one end of a set of independent fibers to be treated in the same way as one end of a ribbon, by positioning and retaining the fibers in a layer easily, quickly, and cheaply, without physically bonding the fibers together, and regardless of the number of fibers in the set, which number may in particular be relatively high, and may vary from one set to another.

The invention provides a device for positioning and retaining optical fibers in a layer, said device including:
a channel-section base, defining a "horizontal" web, and two side flanges projecting from said web, at least one of said side flanges being provided with a slot having a "vertical" first segment of width adapted to the diameter of said fibers, which first segment is open at the top end of the flange, the top end being the end opposite from said web, and a "horizontal" second segment of height adapted to said diameter and of length adapted to positioning said fibers side-by-side in a layer;
a grooved guide surface extending between said side flanges and facing the horizontal segment of each slot, and having a groove aligned with said horizontal segment, and being of width that is the same as the length of the horizontal segment, and
retaining means for retaining said fibers in a layer, which means are hinge mounted to close on said grooved surface.

The device may advantageously further have at least one of the following additional characteristics:
each side flange provided with said slot includes firstly a "bottom" portion formed directly on said web, the free top face of the bottom portion constituting a reference surface on which the horizontal segment of the slot is delimited, and secondly a pair of guide blocks, the two blocks being mounted and retained side-by-side and not touching each other on said reference surface, and cooperating to delimit the vertical segment of said slot between them, at least one of said guide blocks having a bottom recess open at its "inner" face which is that one of its faces which is situated facing the other guide block, which recess delimits the horizontal segment of said slot on said reference surface;
the blocks in each pair and said reference surface include complementary means for holding said blocks in place;
said grooved guide surface is constituted by a "top" surface of a support mounted and retained on said web;
the top face of said support is recessed and receives a grooved plate removably and interchangeably mounted on said support, said groove being formed in said plate; and
the retaining means are a cover that is hinge mounted parallel to said groove on a "rear" edge of said support, which cover co-operates with said support to form a clamp for retaining said fibers in a layer, said clamp in turn being removably mounted on said base.

BRIEF DESCRIPTION OF THE DRAWINGS

The characteristics and advantages of the present invention appear clearly from the following description of a preferred embodiment given with reference to the accompanying drawings, in which.

MORE DETAILED DESCRIPTION

Figure 1:
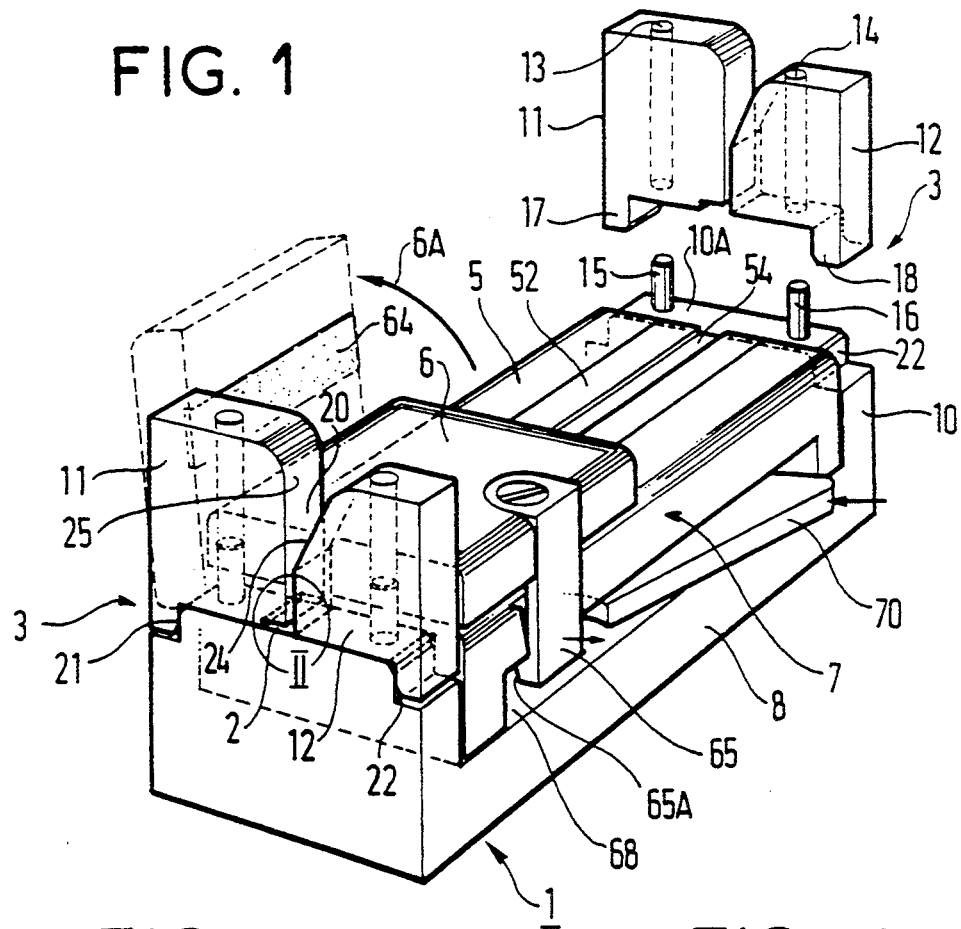
FIG. 1 is a partially exploded diagrammatic perspective view of a device of the invention.

FIG. 1 shows that the device for positioning and retaining optical fibers in a layer includes a channel-section base 1 having a respective L-shaped slot in each of the two side flanges 3 of the base. The two L-shaped slots in the base are assigned to positioning a given set of sheathed optical fibers 4 in a layer (FIG. 2B). The device also includes a support 5 for guiding the layer of fibers, which support interconnects the two L-shaped slots, and retaining means 6 for retaining the layer on the support 5.

Advantageously, the support 5 and the retaining means 6 co-operate to form a retaining clamp for retaining the fibers in a layer, which clamp is removably mounted on the web 8 of the base. The clamp is preferably analogous to the clamp described in U.S. patent application Ser. No. 08/155,702 (now allowed) filed by the Applicant on the same date. That clamp is also described below.

The two flanges 3 are identical and their respective L-shaped slots 2 face each other. Each flange comprises three portions 10, 11, and 12, between which the L-shaped slot in the flange is delimited.

The "bottom" portion 10 is constituted merely by a shoulder formed directly on the web 8. The top surface 10A of the bottom portion constitutes a reference surface, and it defines the abutment plane for the fibers positioned in a layer in the L-shaped slot and retained on the support 5 by the retaining means 6. The small horizontal segment of the L-shaped slot is delimited on the reference surface by the other two portions 11 and 12, so that the fibers can be positioned in a layer in the horizontal segment.

The other two portions 11 and 12 of each flange 3 are removably mounted on the bottom portion 10, as shown with reference to the right-hand flange in FIG. 1. Said other two portions form a pair of guide blocks for guiding the fibers, each of which guide blocks is rectangular in overall shape and is of the same thickness as portion 10. The guide blocks in each pair are mounted and retained side-by-side on the reference surface 10A. The two guide blocks in each pair are described with them being considered to be installed or to be side-by-side and ready to be installed. They are referred to as the rear guide block 11 and the front guide block 12 as a function of their positions.

For the purposes of holding it in place, each block has a vertical hole 13, 14 opening out in its bottom face, and, in the example shown, also in its top face. The bottom portion 10 has two corresponding fingers 15 and 16 projecting relative to its reference surface, for receiving the two blocks. A shoulder 17, 18 projecting relative to the bottom face of each guide block extends the "outer" one of the small vertical faces of the block. The shoulder is received in one of two side notches 21 and 22 provided in the bottom portion 10 of the flange, thereby enabling each block to bear against the reference surface 10A and preventing any rotation of the block about the respective mounting finger 15, 16.

The delimitation of each L-shaped slot 2 is also described with reference to FIG. 2A or 2B. The vertical segment of the slot is delimited by the "inner" vertical face of each of the guide blocks. Said vertical segment is extended upwards by an enlarged entrance 20 via which an individual sheathed fiber can be inserted into the slot 2. Advantageously, the entrance is delimited by a bevelled top end portion 24 of the inner small vertical face of the front guide block 12, the rear guide block not having a bevelled portion.

Preferably, the rear guide block 11 is higher than the front guide block 12, so as to further facilitate inserting a sheathed fiber into the entrance 20 and into the slot 2. In this way, the top end portion 25 of the inner small vertical face of the rear block constitutes a rear abutment and a guide for inserting the fiber into the entrance 20.

One of the guide blocks (the rear guide block 11 in this embodiment) has a small recess 27 in its bottom face, and in the corresponding end of its inner small vertical face.

The recess is of a limited height that corresponds to the width of the vertical segment of the slot, and that is chosen to be almost equal to the diameter d of the fibers 4 received in the slot 2. The length of the recess is also limited, and said length plus the width d of the vertical segment gives the overall length l of the horizontal segment that is assigned to positioning n fibers 4 side-by-side and touching in a layer, l being almost equal to nd. Depending on which one of the blocks (front or rear) has the small recess, the slot 2 is either L-shaped or in the shape of an inverted L.

Figure 2A:
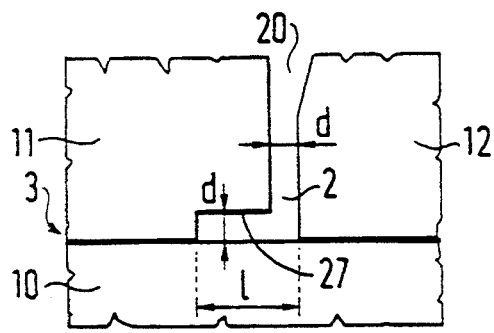
FIG. 2A is an end view on an enlarged scale of the detail II of FIG. 1, showing a positioning slot in the device, for positioning a set of fibers in a layer.
Figure 2B:
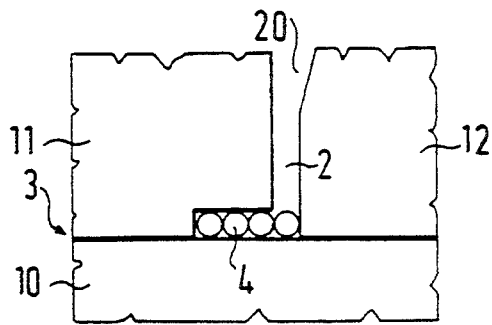
FIG. 2B corresponds to FIG. 2A and shows the set of fibers in the above-mentioned slot.
Figure 3A:
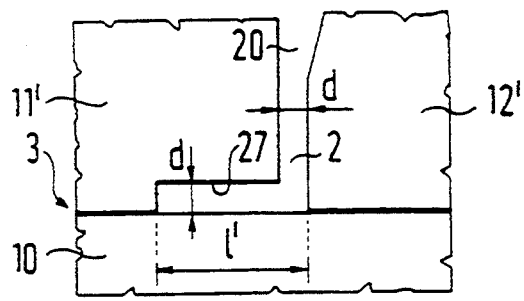
FIGS. 3A and 3B are variants relative to FIGS. 2A and 2B, showing a "modified" slot that is adapted to another set of optical fibers.
Figure 3B:
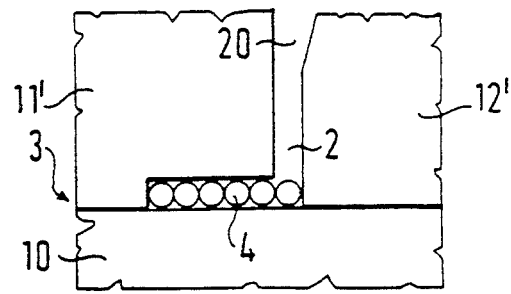

FIGS. 3A and 3B, given as variants relative to FIGS. 2A and 2B and to FIG. 1, correspond to an adapted slot 2' for positioning another set of fibers in a layer, such as a set of n' fibers 4 that are identical to the preceding fibers, or a set comprising a given number of fibers of a diameter that is different from that of the preceding fibers.

Slot 2' is defined by another pair of guide blocks 11' and 12' that replace the preceding pair on the bottom portion 10 of each side flange.

Guide blocks 11' and 12' are similar to blocks 11 and 12, except for their dimensions which make it possible for them to delimit between them an L-shaped slot 2' which has a vertical segment of width d, and a horizontal segment of height d and of length l', when they are placed on the same two fingers 15 and 16 on the bottom portion 10 (FIG. 1) as blocks 11 and 12.

Therefore, guide blocks 11' and 12' are not described in any more detail. However, it should be noted that the vertical segment of slot 2' is offset compared with the vertical segment of slot 2, so that the horizontal segments of both of those slots remain centered on the same longitudinal axis of the support 5.

In another variant embodiment, both of the blocks in each pair have recesses in their bottom faces. The blocks then delimit an inverted-T shaped slot between them on the surface 10A, the vertical segment of which slot may correspond to the longitudinal axis of the support 5.

The clamp 7 is described with reference to FIG. 1 or 4. The clamp includes the support 5, which is rectangular in shape and is relatively flat, a grooved plate 52 removably mounted in a complementary recess provided for that purpose in the top face of the support, and a cover constituting the above-mentioned retaining means 6, which cover is hinge mounted so that it can be closed on the support and on the installed plate. The plate 52 has a channel-section groove 54 along the longitudinal axis of its top face. The groove is assigned to a given layer of fibers. A screw 56 retains the installed plate, the top surfaces of the support and of the plate then being flush with each other.

The screw 56 enables the installed plate to be removed and replaced with another similar plate that has a groove which is of different cross-section and which is assigned to another layer of fibers, the groove being in register with the slot 2 in each of the flanges of the base of the device.

The plate 52, or any other similar plate, has a retaining element 57 for retaining the installed layer of fibers in the groove in the plate. The element interrupts the groove and is situated facing the cover.

The cover 6 is hinged about a pin 60 securing it to the support, the pin being disposed in the vicinity of a "rear" edge of the support, and the cover being provided with a bored shoulder 61 projecting under the corresponding rear edge of the cover. In the closed position, the cover extends over the width of the support, but preferably covers only a right-hand end portion (or, in a variant, a left-hand end portion) of the support. Depending on where it is disposed, the cover co-operates with the support to define a right-hand clamp or (in a variant) a left-hand clamp that is symmetrical to the right-hand clamp. Arrow 6A shows the direction in which the cover is opened. The cover is provided with an elastically-deformable strip 64 projecting relative to the inside face of the cover and retaining the installed layer of fibers in the groove 54 when the cover is closed and locked closed.

A catch 65 that is secured to the front edge of the cover locks the cover closed. The end 65A of the catch can be snap-fastened under the front edge of the support. A housing 68 provided in the bottom face of the support receives said end 65A. A lever 70 is also mounted in the housing 68. The lever is hinged about a pin 71 engaged in the support so as to pivot parallel to the support and facing the end 65A of the catch. The lever is urged into the inactive position by a spring 72, and operated against the action of the spring to release the end of the catch, which is pushed out of the housing, and to enable the cover to be then fully opened by hand.

The support 5 further has two holes 69A and 69B, or other analogous means in its inside face, for mounting the clamp on the channel-section base.

Figure 4:
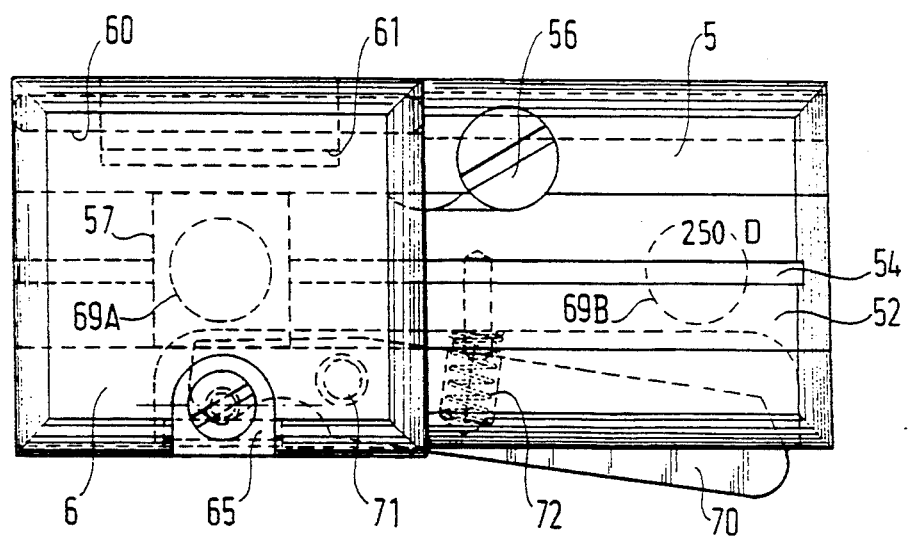
FIG. 4 is a plan view of one of the elements of the FIG. 1 device, which element is referred to as a "clamp for retaining optical fibers"
Figure 5:
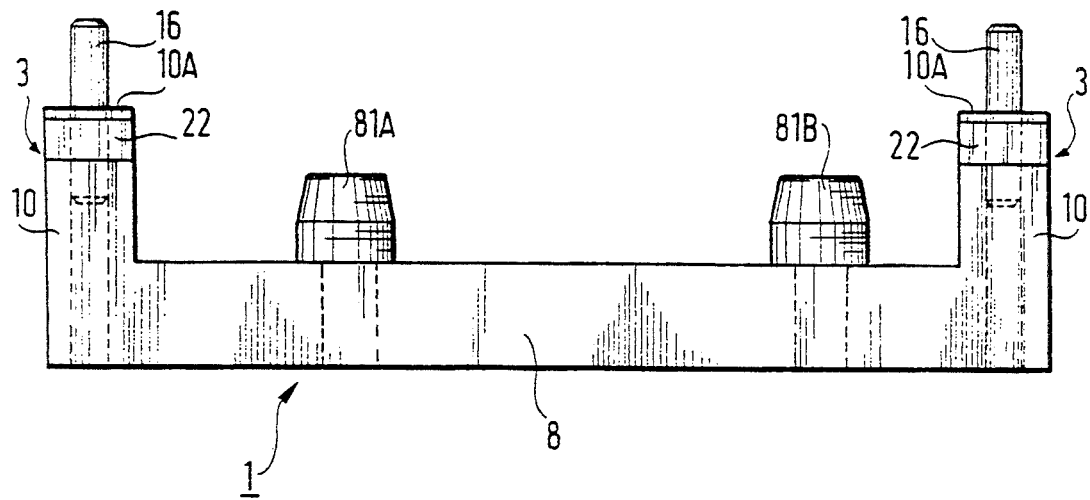
FIG. 5 is a front view of a partially-equipped base of the FIG. 1 device.

FIG. 4 shows that the base has two corresponding fingers 81A and 81B, or other means, that are complementary to the holes 69A, 69B, and that project from the web 8 of the base. The fingers are centered on the middle longitudinal axis of the web, but each finger is preferably offset differently from the respective nearer one of the flanges (right-hand flange or left-hand flange), so that a "left-hand" clamp or a "right-hand" clamp can be keyed correctly onto the base.

Advantageously, the clamp and the base are made of metal, and the base is magnetized. Magnetizing the metal base enables the clamp to be better held in place on the metal base. When the clamp 7 is in place on the base 1 (FIG. 1), the bottom of the groove 54 and the reference surface 10A defined on each of the side flanges 3 are in the same plane.

In a variant given relative to FIG. 1, the above-mentioned guide support 5 may be formed directly by the web of the base, the web then being referred to as the "guide web", the top surface of the guide web receiving the layer of fibers formed in the horizontal segments of the slots in the side flanges, and retaining said layer via retaining means. In this variant, the guide web is advantageously recessed so that a grooved plate can be mounted thereon, the grooved plate being adapted to the two slots defined in the flanges. The recess in the guide web may be provided over the length of the web, or over a large portion of the width thereof, thereby enabling a suitable grooved plate to be installed from the front edge of the guide web.

Also in a variant, the device includes only one adaptable slot in only one of the flanges of the base, while the other flange leaves the fibers free. The flange that is provided with the slot is preferably the one close to the retaining means for retaining the layer of fibers on the guide support or on the guide web.

We claim:

1. A device for positioning and retaining optical fibers in a "horizontal" layer, said device including:
    a channel-section base, defining a "horizontal" web, and two side flanges projecting from said web, at least one of said side flanges being provided with a slot having a "vertical" first segment of width substantially the same as the diameter of said fibers, which first segment is open at a top end of the flange, the top end being the end opposite from said web, and a "horizontal" second segment of height substantially the same as said diameter and of length adapted to positioning said fibers side-by-side in a layer;
    a grooved guide member extending between said side flanges and facing the horizontal segment of each slot, and having a groove aligned with said horizontal segment, and being of width that is the same as the length of the horizontal segment, and
    retaining means for retaining said fibers in a layer, which means are hinge mounted to close on said grooved surface.

2. A device according to claim 1, wherein each side flange provided with said slot includes firstly a "bottom" portion formed directly on said web, a free top face of the bottom portion constituting a reference surface on which the horizontal segment of the slot is delimited, and secondly a pair of guide blocks, the two blocks being mounted and retained side-by-side and not touching each other on said reference surface, and cooperating to delimit the vertical segment of said slot between them, at least one of said guide blocks having a bottom recess open at an "inner" face thereof which is situated facing the other guide block, which recess delimits the horizontal segment of said slot on said reference surface.

3. A device according to claim 2, wherein said pair of guide blocks is chosen from sets of pairs of blocks, that are interchangeably mounted on said reference surface, and that are used to obtain individual slots of dimensions adapted to said fibers to be positioned in a layer.

4. A device according to claim 2, wherein the blocks in each pair and said reference surface include complementary means for holding said blocks in place.

5. A device according to claim 2, wherein each slot includes an enlarged entrance for inserting an individual fiber, which entrance extends said vertical segment up to the top end of its side flange, and is delimited by a bevelled end portion on a small inner face of one of the guide blocks.

6. A device according to claim 2, wherein, when the blocks are in place on said reference surface, one of said blocks is substantially higher than the other block.

7. A device according to claim 2, wherein each one of the blocks in each pair includes a bottom end shoulder extending each block's outer face which is opposite from said inner face, and said bottom portion has two end notches receiving the bottom shoulders of the pair of guide blocks 8. A device according to claim 1, wherein said grooved guide member is constituted by a "top" face of a support mounted and retained on said web.

9. A device according to claim 8, wherein the top face of said support is recessed and receives a grooved plate removably and interchangeably mounted on said support, said groove being formed in said plate.

10. A device according to claim 8, wherein the retaining means are a cover that is hinge mounted parallel to said groove on a "rear" edge of said support, which cover cooperates with said support to form a clamp for retaining said fibers in a layer, said clamp being removably mounted on said base.

11. A device according to claim 10, wherein said cover is equipped with a catch for locking said cover closed on said support, which catch is secured to a "front" edge of the cover and can be snap-fastened under the corresponding front edge of said support, and wherein said support is equipped with a lever for unlocking said snap-fastened catch, which lever is pivotally mounted in said support facing said catch and can be operated from the "front" edge of said support.

12. A device according to claim 1, wherein the slot in each side flange is L-shaped.

13. A device according to claim 1, wherein the slot in each side flange is in the shape of an inverted T.

* * * * *